(12) United States Patent
Jain et al.

(10) Patent No.: US 10,318,990 B2
(45) Date of Patent: Jun. 11, 2019

(54) SELECTING USERS RELEVANT TO A GEOFENCE

(71) Applicant: eBay Inc., San Jose, CA (US)

(72) Inventors: Chintan Jain, Hillsboro, OR (US); Rui Kong, Lake Oswego, OR (US)

(73) Assignee: eBay Inc., San Jose, CA (US)

( * ) Notice: Subject to any disclaimer, the term of this patent is extended or adjusted under 35 U.S.C. 154(b) by 0 days.

(21) Appl. No.: 14/242,563

(22) Filed: Apr. 1, 2014

(65) Prior Publication Data

US 2015/0278865 A1 Oct. 1, 2015

(51) Int. Cl.
*G06Q 30/02* (2012.01)
*H04W 4/021* (2018.01)

(52) U.S. Cl.
CPC ..... *G06Q 30/0261* (2013.01); *G06Q 30/0254* (2013.01); *G06Q 30/0255* (2013.01); *H04W 4/021* (2013.01)

(58) Field of Classification Search
CPC .............................. G06Q 30/00; G06Q 30/02
See application file for complete search history.

(56) References Cited

U.S. PATENT DOCUMENTS

| | | | |
|---|---|---|---|
| 6,618,593 B1 | 9/2003 | Drutman et al. | |
| 7,835,937 B1 | 11/2010 | Karlsson et al. | |
| 7,848,765 B2 | 12/2010 | Phillips et al. | |
| 8,295,854 B2 | 10/2012 | Osann, Jr. | |
| 8,755,824 B1 * | 6/2014 | Wang | H04W 4/021 455/456.3 |
| 8,782,560 B2 | 7/2014 | Purdy et al. | |
| 9,043,222 B1 * | 5/2015 | Kerr | G06Q 30/0621 705/14.58 |
| 9,116,818 B2 * | 8/2015 | Bilange | G06F 12/0866 |
| 9,200,901 B2 * | 12/2015 | Khosravy | G06Q 30/0241 |

(Continued)

FOREIGN PATENT DOCUMENTS

| AU | 2013355371 B2 | 5/2016 |
|---|---|---|
| AU | 2016216630 A1 | 9/2016 |

(Continued)

OTHER PUBLICATIONS

"International Application Serial No. PCT/US2015/023806, International Search Report dated Jul. 6, 2015", 2 pgs.

(Continued)

*Primary Examiner* — Eric R Netzloff
(74) *Attorney, Agent, or Firm* — SBMC

(57) ABSTRACT

A system may identify attributes of a geofence surrounding a location. The attributes of the geofence may represent merchant characteristics of a brick-and-mortar store and may further represent item characteristics of merchandise items available for sale from the brick-and-mortar store. A subset of users from a plurality of users eligible to receive the geofence may be selected based at least in part on matching the attributes of the geofence to preferences associated with each user among the subset of users. Geofence data representing the geofence may be sent to each of the client devices operated by the subset of the plurality of users. An indication may be received from a client device operated by a user of the user crossing into the geofence based on the geofence data. Lastly, a notification may be presented to the client device operated by the user.

20 Claims, 8 Drawing Sheets

(56) References Cited

U.S. PATENT DOCUMENTS

| | | | |
|---|---|---|---|
| 9,398,409 B2* | 7/2016 | Porter | H04W 4/029 |
| 9,432,806 B2 | 8/2016 | Zises | |
| 9,565,523 B1 | 2/2017 | Steger et al. | |
| 9,591,445 B2 | 3/2017 | Zises | |
| 9,736,636 B1* | 8/2017 | DeLuca | H04W 4/021 |
| 9,867,000 B2 | 1/2018 | Zises | |
| 2003/0096621 A1 | 5/2003 | Jana et al. | |
| 2006/0270421 A1* | 11/2006 | Phillips | G08B 21/0236 455/457 |
| 2007/0027768 A1 | 2/2007 | Collins et al. | |
| 2007/0162328 A1 | 7/2007 | Reich | |
| 2008/0026771 A1 | 1/2008 | Hill | |
| 2008/0040219 A1 | 2/2008 | Kim et al. | |
| 2008/0160956 A1 | 7/2008 | Jackson et al. | |
| 2008/0162032 A1 | 7/2008 | Wuersch et al. | |
| 2008/0248815 A1 | 10/2008 | Busch | |
| 2008/0268876 A1 | 10/2008 | Gelfand et al. | |
| 2009/0061884 A1 | 3/2009 | Rajan et al. | |
| 2009/0063274 A1 | 3/2009 | Dublin, III et al. | |
| 2009/0064144 A1 | 3/2009 | Abhyanker | |
| 2009/0094093 A1* | 4/2009 | Phan | G06Q 30/02 705/14.66 |
| 2009/0094196 A1 | 4/2009 | Piwowarski et al. | |
| 2009/0286553 A1 | 11/2009 | Northway et al. | |
| 2009/0319178 A1 | 12/2009 | Khosravy et al. | |
| 2010/0036711 A1 | 2/2010 | Shenfield et al. | |
| 2010/0138295 A1 | 6/2010 | Caron et al. | |
| 2010/0159904 A1 | 6/2010 | Colligan et al. | |
| 2010/0203901 A1 | 8/2010 | Dinoff et al. | |
| 2010/0241512 A1 | 9/2010 | Tirpak et al. | |
| 2010/0262449 A1* | 10/2010 | Monteforte | G06Q 30/02 705/7.34 |
| 2010/0274680 A1 | 10/2010 | Carlson et al. | |
| 2011/0004501 A1 | 1/2011 | Pradhan et al. | |
| 2011/0137813 A1 | 6/2011 | Stewart | |
| 2011/0145089 A1 | 6/2011 | Khunger et al. | |
| 2011/0153426 A1 | 6/2011 | Reddy et al. | |
| 2012/0008526 A1 | 1/2012 | Borghei | |
| 2012/0030007 A1 | 2/2012 | Ye | |
| 2012/0047565 A1 | 2/2012 | Petersen | |
| 2012/0054001 A1 | 3/2012 | Zivkovic et al. | |
| 2012/0074565 A1 | 3/2012 | Koroku | |
| 2012/0109744 A1 | 5/2012 | Yeh et al. | |
| 2012/0123852 A1 | 5/2012 | Noh | |
| 2012/0126998 A1 | 5/2012 | Morgan et al. | |
| 2012/0166520 A1 | 6/2012 | Lindsay et al. | |
| 2012/0173370 A1 | 7/2012 | Soroca et al. | |
| 2012/0265585 A1 | 10/2012 | Muirbrook et al. | |
| 2012/0276928 A1 | 11/2012 | Shutter | |
| 2012/0302258 A1 | 11/2012 | Pai et al. | |
| 2012/0310527 A1 | 12/2012 | Yariv et al. | |
| 2013/0060641 A1 | 3/2013 | Al Gharabally | |
| 2013/0099977 A1 | 4/2013 | Sheshadri et al. | |
| 2013/0326137 A1* | 12/2013 | Bilange | G06F 12/0866 711/113 |
| 2013/0332274 A1* | 12/2013 | Faith | G06Q 30/0239 705/14.53 |
| 2014/0025432 A1 | 1/2014 | Thomassen et al. | |
| 2014/0057648 A1 | 2/2014 | Lyman et al. | |
| 2014/0095296 A1 | 4/2014 | Angell et al. | |
| 2014/0155094 A1 | 6/2014 | Zises | |
| 2014/0156410 A1 | 6/2014 | Wuersch et al. | |
| 2014/0162692 A1* | 6/2014 | Li | H04W 4/021 455/456.3 |
| 2015/0213481 A1 | 7/2015 | Yuan | |
| 2015/0269624 A1* | 9/2015 | Cheng | G06Q 30/0267 705/14.58 |
| 2015/0371270 A1 | 12/2015 | McDevitt et al. | |
| 2016/0048857 A1 | 2/2016 | Jain et al. | |
| 2016/0330583 A1 | 11/2016 | Zises | |
| 2017/0180932 A1 | 6/2017 | Zises | |
| 2018/0109919 A1 | 4/2018 | Zises | |

FOREIGN PATENT DOCUMENTS

| | | |
|---|---|---|
| AU | 2016216630 B2 | 5/2017 |
| CN | 1967527 A | 5/2007 |
| CN | 101374274 A | 2/2009 |
| CN | 102291435 A | 12/2011 |
| CN | 104969219 A | 10/2015 |
| CN | 105528384 A | 4/2016 |
| CN | 106165463 A | 11/2016 |
| CN | 109034918 A | 12/2018 |
| CN | 109034919 A | 12/2018 |
| CN | 109040972 A | 12/2018 |
| KR | 1020120035163 A | 4/2012 |
| KR | 1020120037541 A | 4/2012 |
| WO | 2008/134595 A1 | 11/2008 |
| WO | 2012/000107 A1 | 1/2012 |
| WO | WO-2013188409 A1 | 12/2013 |
| WO | 2014/055571 A1 | 4/2014 |
| WO | 2014/085657 A1 | 6/2014 |
| WO | 2014/089161 A2 | 6/2014 |
| WO | 2014/089161 A3 | 10/2014 |
| WO | WO-2015153721 A1 | 10/2015 |

OTHER PUBLICATIONS

"International Application Serial No. PCT/US2015/023806, Written Opinion dated Jul. 6, 2015", 7 pgs.

"Korean Application Serial No. 2016-7030434, Office Action dated Aug. 2, 2017", with English translation of claims, 10 pgs.

"International Application Serial No. PCT/US2015/023806, International Preliminary Report on Patentability dated Oct. 13, 2016", 9 pgs.

Final Office Action received for U.S. Appl. No. 14/458,045, dated Jan. 3, 2018, 17 pages.

Response to Non-Final Office Action filed on Sep. 20, 2017 for U.S. Appl. No. 14/458,045, dated Mar. 22, 2017, 17 pages.

Response to Office Action filed on Sep. 29, 2017 for Korean Patent Application No. 10-2016-7030434, dated Aug. 2, 2017, 15 pages (including English Claims).

Response to First Examiner Report filed on Apr. 19, 2016 for Australian Patent Application No. 2013355371, dated Mar. 11, 2016, 24 pages.

Office Action received for Chinese Patent Application No. 201380072150.7, dated Dec. 5, 2017, 6 pages. ( Including English Translation).

Office Action received for Chinese Patent Application No. 201380072150.7, dated Jun. 27, 2017, 11 pages.

Response to Office Action filed on Nov. 13, 2017, for Chinese Patent Application No. 201380072150.7, dated Jun. 27, 2017, 18 pages.

Response to Office Action filed on Feb. 12, 2018, for Chinese Patent Application No. 201380072150.7, dated Dec. 5, 2017, 16 pages.

First Examiner Report received for Australian Patent Application No. 2016216630, dated Jan. 12, 2017, 3 pages.

Response to First Examiner Report filed on Apr. 24, 2017, for Australian Patent Application No. 2016216630, dated Feb. 10, 2017, 13 pages.

Response to Office Action filed on Apr. 20, 2018, for Korean Patent Application No. 10-2016-7030434, dated Feb. 23, 2018, 14 pages.

Applicant Initiated Interview Summary received for U.S. Appl. No. 13/674,003, dated Jul. 10, 2015, 3 pages.

Final Office Action received for U.S. Appl. No. 13/674,003, dated Aug. 18, 2016, 7 pages.

Response to Non-Final Office Action filed on Dec. 22, 2014 for U.S. Appl. No. 13/674,003, dated Sep. 22, 2014, 19 pages.

International Search Report received for PCT Application No. PCT/US2013/062938, dated Jan. 16, 2014, 2 pages.

Written Opinion received for PCT Application No. PCT/US2013/062938, dated Jan. 16, 2014, 10 pages.

International Preliminary Report on Patentability received for PCT Application No. PCT/US2013/062938, dated Apr. 16, 2015, 11 pages.

International Search Report received for PCT Application No. PCT/US2013/072339, dated Apr. 28, 2014, 4 pages.

(56) References Cited

OTHER PUBLICATIONS

Written Opinion received for PCT Application No. PCT/US2013/072339, dated Apr. 28, 2014, 5 pages.
Invitation to Pay Additional Fees and Partial Search Report received for PCT Application No. PCT/US2013/072339, dated Feb. 14, 2014, 2 pages.
International Preliminary Report on Patentability received for PCT Application No. PCT/US2013/072339 dated Jun. 11, 2015, 7 pages.
International Search Report received for PCT Application No. PCT/US2013/073021, dated Aug. 22, 2014, 2 pages.
Written Opinion received for PCT Application No. PCT/US2013/073021, dated Aug. 22, 2014, 6 pages.
International Preliminary Report on Patentability received for PCT Application No. PCT/US2013/073021, dated Jun. 18, 2015, 8 pages.
TSO Mobile & Public Transportation, "Wondering how TSO Mobile & GPS Tracking Benefit Passengers and the Public Transportation Industry", Retrieved from the Internet: <URL: http://www.tsomobile.com/tso-mobile-public-transportation>, Aug. 25, 2014, 4 pages.
Google Play, "Moovit-Real-time Transit Info.—Android Apps on Google Play", Jul. 24, 2013, 2 pages.
Office Action received for Korean Patent Application No. 10-2016-7021649, dated Feb. 10, 2017, 6 pages. (Including English Translation).
Office Action received for Korean Patent Application No. 10-2016-7021649, dated Oct. 14, 2016, 6 pages. (Including English Translation).
Response to Office Action filed on Apr. 10, 2017, for Korean Patent Application No. 10-2016-7021649, dated Feb. 10, 2017, 17 pages. (Including English Pending Claims).
Response to Office Action filed on Dec. 14, 2016, for Korean Patent Application No. 10-2016-7021649, dated Oct. 14, 2016, 16 pages. (Including English Pending Claims).
Office Action received for Korean Patent Application No. 10-2016-7030434, dated Feb. 23, 2018, 5 pages. (Including English Translation).
Office Action received for Korean Patent Application No. 10-2017-7026574, dated Oct. 31, 2017, 5 pages. (Including English Translation).
Response to Office Action filed on Dec. 28, 2017, for Korean Patent Application No. 10-2017-7026574, dated Oct. 31, 2017, 24 pages. (Including English Pending Claims).
Applicant initiated interview received for U.S. Appl. No. 13/674,003, dated Jan. 5, 2015, 3 pages.
Applicant Initiated Interview Summary received for U.S. Appl. No. 13/674,003, dated Apr. 27, 2016, 4 pages.
Final Office Action received for U.S. Appl. No. 13/674,003, dated May 7, 2015, 21 pages.
Non-Final Office Action received for U.S. Appl. No. 13/674,003, dated Jan. 25, 2016, 20 pages.
Non-Final Office Action received for U.S. Appl. No. 13/674,003, dated Sep. 22, 2014, 19 pages.
Response to Final Office Action filed on Jul. 6, 2015, for U.S. Appl. No. 13/674,003, dated May 7, 2015, 16 pages.
Response to Non-Final Office Action filed on Apr. 25, 2016 for U.S. Appl. No. 13/674,003, dated Jan. 25, 2016, 12 pages.
Applicant Initiated Interview Summary received for U.S. Appl. No. 13/691,390, dated Mar. 8, 2016, 3 pages.
Final Office Action received for U.S. Appl. No. 13/691,390, dated Nov. 6, 2015, 15 pages.
Non-Final Office Action received for U.S. Appl. No. 13/691,390, dated Jul. 10, 2015, 13 pages.
Non-Final Office Action received for U.S. Appl. No. 13/691,390, dated Jun. 9, 2016, 21 pages.
Response to Final Office Action filed on Mar. 7, 2016 for U.S. Appl. No. 13/691,390, dated Nov. 6, 2015, 11 pages.
Response to Non-Final Office Action filed on Oct. 13, 2015, for U.S. Appl. No. 13/691,390, dated Jul. 10, 2015, 12 pages.
Response to Restriction Requirement filed on May 26, 2015, for U.S. Appl. No. 13/691,390, dated Feb. 26, 2015, 10 pages.
Restriction Requirement received for U.S. Appl. No. 13/691,390, dated Feb. 26, 2015, 9 pages.
Applicant Initiated Interview Summary for U.S. Appl. No. 13/691,390, dated Oct. 19, 2015, 3 pages.
Appeal Brief for U.S. Appl. No. 13/693,145, filed Oct. 13, 2015, 25 pages.
Final Office Action received for U.S. Appl. No. 13/693,145, dated Jul. 1, 2015, 19 pages.
Non-Final Office Action received for U.S. Appl. No. 13/693,145, dated Aug. 14, 2014, 15 pages.
Non-Final Office Action received for U.S. Appl. No. 13/693,145, dated Feb. 17, 2015, 19 pages.
Notice of Allowance received for U.S. Appl. No. 13/693,145, dated Apr. 8, 2016, 13 pages.
Notice of Allowance received for U.S. Appl. No. 13/693,145, dated Apr. 26, 2016, 8 pages.
Response to Non-Final Office Action filed on Jan. 30, 2015, for U.S. Appl. No. 13/693,145, dated Aug. 14, 2014, 14 pages.
Response to Non-Final Office Action filed on May 14, 2015, for U.S. Appl. No. 13/693,145, dated Feb. 17, 2015, 14 pages.
Extended European Search Report received for European Patent Application No. 13860378.2, dated Jun. 22, 2016, 11 pages.
Non-Final Office Action received for U.S. Appl. No. 14/458,045, dated Mar. 22, 2017, 14 pages.
Response to Final Office Action filed on Apr. 2, 2018, for U.S. Appl. No. 14/458,045, dated Jan. 3, 2018, 22 Pages.
Non-Final Office Action received for U.S. Appl. No. 15/216,074, dated Sep. 28, 2016, 19 pages.
Notice of Allowance received for U.S. Appl. No. 15/216,074, dated Oct. 24, 2016, 8 pages.
Preliminary Amendment received for U.S. Appl. No. 15/216,074, dated Jul. 22, 2016, 9 pages.
Response to Non-Final Office Action filed on Oct. 6, 2016 for U.S. Appl. No. 15/216,074, dated Sep. 28, 2016, 9 pages.
Non-Final Office Action received for U.S. Appl. No. 15/450,565, dated Apr. 17, 2017, 10 pages.
Notice of Allowance received for U.S. Appl. No. 15/450,565, dated Sep. 13, 2017, 9 pages.
Preliminary Amendment for U.S. Appl. No. 15/450,565, filed Apr. 4, 2017, 9 pages.
Response to Non-Final Office Action filed on Jun. 1, 2017, for U.S. Appl. No. 15/450,565, dated Apr. 17, 2017, 8 Pages.
Preliminary Amendment for U.S. Appl. No. 15/835,844, filed Dec. 29, 2017, 8 pages.
Office Action received for Canadian Patent Application No. 2,893,934, dated Nov. 2, 2017, 3 pages.
Office Action received for Canadian Patent Application No. 2,893,934, dated Nov. 22, 2016, 3 pages.
Office Action received for Canadian Patent Application No. 2,893,934, dated Sep. 29, 2015, 4 pages.
Response to Office Action filed on Apr. 23, 2018, for Canadian Patent Application No. 2,893,934, dated Nov. 2, 2017, 9 pages.
Response to Office Action filed on Mar. 22, 2016 for Canadian Patent Application No. 2,893,934, dated Sep. 29, 2015, 26 pages.
Response to Office Action filed on May 17, 2017, for Canadian Patent Application No. 2,893,934, dated Nov. 22, 2016, 26 pages.
First Examiners Report received for Australian Patent Application No. 2013355371, dated Mar. 11, 2016, 3 pages.
Non-Final Office Action received for U.S. Appl. No. 15/835,844, dated Sep. 10, 2018, 13 pages.
Notice of Allowance received for Korean Patent Application No. 10-2015-7017576, dated May 9, 2016, 3 pages (1 page of English Translation and 2 pages of Official Copy).
Office Action received for Korean Patent Application No. 10-2018-7020841, dated Oct. 2, 2018, 7 pages.
Non-Final Office Action received for U.S. Appl. No. 14/458,045, dated Oct. 5, 2018, 19 pages.
Final Office Action Received for U.S. Appl. No. 15/835,844 dated Jan. 10, 2019, 14 pages.
Response to Non-Final Office Action filed on Dec. 7, 2018, for U.S. Appl. No. 15/835,844, dated Sep. 10, 2018, 13 pages.
Response to Non-Final Office Action filed on Jan. 7, 2019, for U.S. Appl. No. 14/458,045, dated Oct. 5, 2018, 13 pages.

(56) References Cited

OTHER PUBLICATIONS

Response to Office Action filed on Dec. 3, 2018, for Korean Patent Application No. 10-2018-7020841, dated Oct. 2, 2018, 18 pages(3 pages of English Pending Claims and 15 pages of Official Copy).
Office Action received for Korean Patent Application No. 10-2018-7032783, dated Feb. 7, 2019, 10 pages (5 pages of English Translation and 5 pp. of Official Copy).
Response to Office Action filed on Apr. 8, 2019, for Korean Patent Application No. 10-2018-7032783, dated Feb. 7, 2019, 16 pages (11 pages of Official copy and 5 pages of English Translation).
Advisory Action received for U.S. Appl. No. 15/835,844 dated Mar. 15, 2019, 4 pages.
Notice of Allowance received for U.S. Appl. No. 15/835,844, dated Apr. 12, 2019, 16 pages.
Response to Final Office Action filed on Mar. 6, 2019 for U.S. Appl. No. 15/835,844, dated Jan. 10, 2019, 13 pages.
Supplemental Response to Final Office Action filed on Mar. 12, 2019 for U.S. Appl. No. 15/835,844 dated Jan. 10, 2019, 13 pages.
Office Action received for Chinese Patent Application No. 201580017648.2, dated Mar. 5, 2019, 21 pages.

* cited by examiner

SELECTING USERS RELEVANT TO A GEOFENCE

TECHNICAL FIELD

The subject matter disclosed herein generally relates to the processing of data. Specifically, the present disclosure addresses systems and methods to select users relevant to attributes of a geofence.

BACKGROUND

A user operating a mobile device with location-based services may receive geofence data from a central server. The geofence data may be used to detect when the user crosses into a geofence. As a result, the mobile device may receive notifications pertaining to the geofence. However, for various reasons, the user may discard the received notification.

BRIEF DESCRIPTION OF THE DRAWINGS

Some embodiments are illustrated by way of example and not limitation in the figures of the accompanying drawings.

DETAILED DESCRIPTION

Example methods and systems are directed to selecting users relevant to attributes of a geofence. Examples merely typify possible variations. Unless explicitly stated otherwise, components and functions are optional and may be combined or subdivided, and operations may vary in sequence or be combined or subdivided. In the following description, for purposes of explanation, numerous specific details are set forth to provide a thorough understanding of example embodiments. It will be evident to one skilled in the art, however, that the present subject matter may be practiced without these specific details.

A system may be used to provide geofence data for a geofence that is determined to be relevant to a user. The system may determine that the geofence is relevant to the user by matching attributes of the geofence to the preferences of the user. Once a user has been identified to be relevant to the geofence, the system may send the geofence data to the mobile device belonging to the user. The geofence data may be used by the mobile device to detect that the user crosses the geofence. Thereafter, notifications may be presented to the mobile device of the user. Moreover, the resulting notifications may present information that is relevant to the user. Alternatively, crossing the geofence may trigger an option to be performed by the mobile device of the user. The operation may include displaying the notifications on the mobile device of the user. The notifications may be included as part of the geofence data that is sent from the system to the mobile device.

Figure 1:
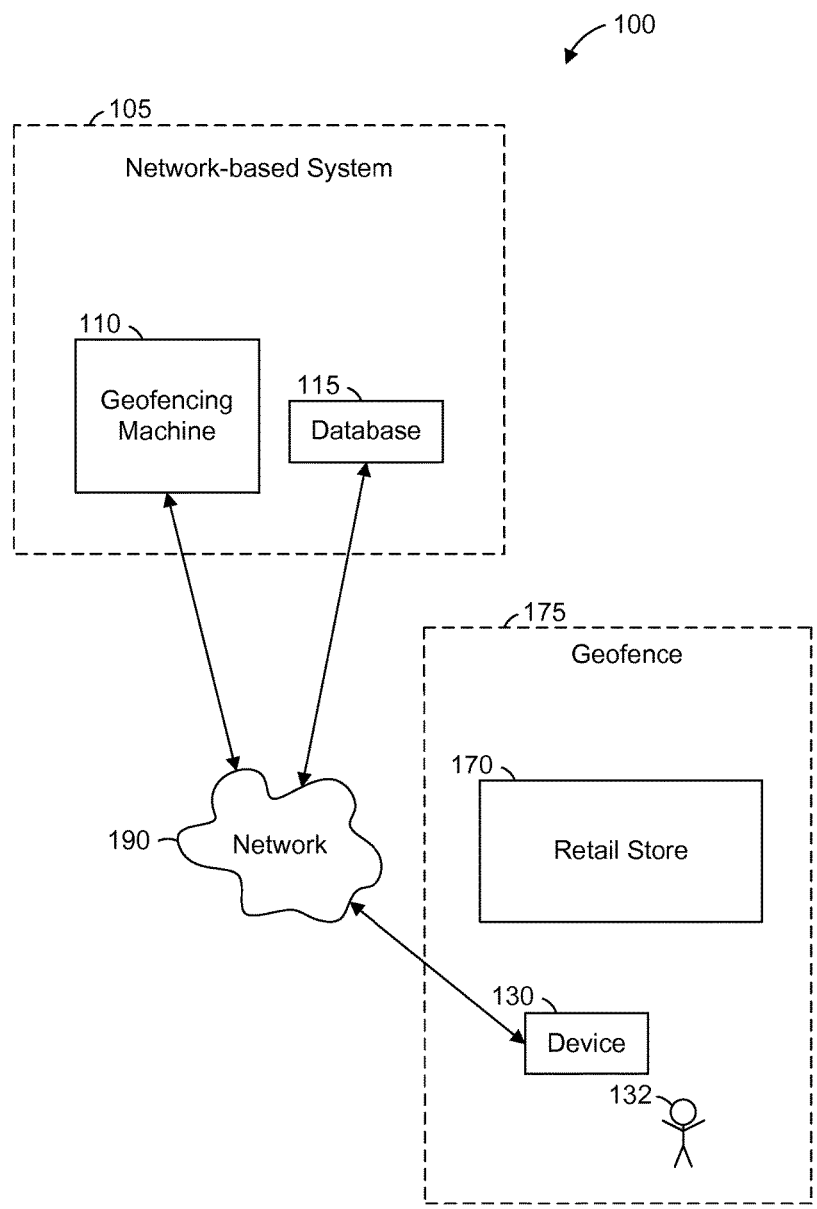
FIG. 1 is a network diagram illustrating a network environment suitable for selecting users relevant to attributes of a geofence, according to some example embodiments.

FIG. 1 is a network diagram illustrating a network environment 100 suitable for selecting users relevant to attributes of a geofence, according to some example embodiments. The network environment 100 includes a geofencing machine 110, a database 115, and devices 130, and 150, all communicatively coupled to each other via a network 190.

Also shown in FIG. 1 is user 132. User 132 may be a human user (e.g., a human being), a machine user (e.g., a computer configured by a software program to interact with the device 130), or any suitable combination thereof (e.g., a human assisted by a machine or a machine supervised by a human). The user 132 is not part of the network environment 100, but is associated with the device 130 and may be a user of the device 130. For example, the device 130 may be a desktop computer, a vehicle computer, a tablet computer, a navigational device, a portable media device, or a smart phone belonging to the user 132.

Also included in FIG. 1 is a geofence 175 that is surrounding a retail store 170. The geofence 175 may include attributes that represent characteristics of the retail store 170 such as hours of operation of the retail store 170, location of the retail store 170, merchandise items available for sale from the retail store 170, or any suitable combination thereof. The geofencing machine 110 may also receive preferences of the user 132 from the device 130 operated by the user 132. The geofencing machine 110 may determine that the user 132 has preferences that match with the attributes of the geofence 175. As a result, the system may send geofence data to the device 130 operated by the user 132, the geofence data being representative of the geofence 175 or a series of geofences including geofence 175. Thereafter, the geofence data on the device 130 may be used to detect when the user 132 crosses into the geofence 175 or is within the geofence 175. As a result, the geofencing machine may present a notification to the device 130 of the user 132 detected as being within the geofence 175. Moreover, the notification may pertain to merchandise items from the retail store 170. In some examples, when a user, such as user 132, crossing into a geofence, such as geofence 175, an application running on the device 130 may trigger some operation to be performed by the device 130. The operation may include the device 130 displaying the notification which pertains to the merchandise items.

Any of the machines, databases, or devices shown in FIG. 1 may be implemented in a general-purpose computer modified (e.g., configured or programmed) by software to be a special-purpose computer to perform one or more of the functions described herein for that machine, database, or device. For example, a computer system able to implement any one or more of the methodologies described herein is discussed below with respect to FIG. 8. As used herein, a "database" is a data storage resource and may store data structured as a text file, a table, a spreadsheet, a relational database (e.g., an object-relational database), a triple store, a hierarchical data store, or any suitable combination thereof. Moreover, any two or more of the machines, databases, or devices illustrated in FIG. 1 may be combined into a single machine, and the functions described herein for any single machine, database, or device may be subdivided among multiple machines, databases, or devices.

The network 190 may be any network that enables communication between or among machines, databases, and devices (e.g., the geofencing machine 110 and the device 130). Accordingly, the network 190 may be a wired network, a wireless network (e.g., a mobile or cellular network), or any suitable combination thereof. The network 190 may include one or more portions that constitute a private network, a public network (e.g., the Internet), or any suitable combination thereof. Accordingly, the network 190 may include one or more portions that incorporate a local area network (LAN), a wide area network (WAN), the Internet, a mobile telephone network (e.g., a cellular network), a wired telephone network (e.g., a plain old telephone system (POTS) network), a wireless data network (e.g., WiFi network or WiMax network), or any suitable combination thereof. Any one or more portions of the network 190 may communicate information via a transmission medium. As used herein, "transmission medium" shall be taken to include any intangible medium that is capable of storing, encoding, or carrying instructions for execution by a machine, and includes digital or analog communication signals or other intangible media to facilitate communication of such software.

Figure 2:
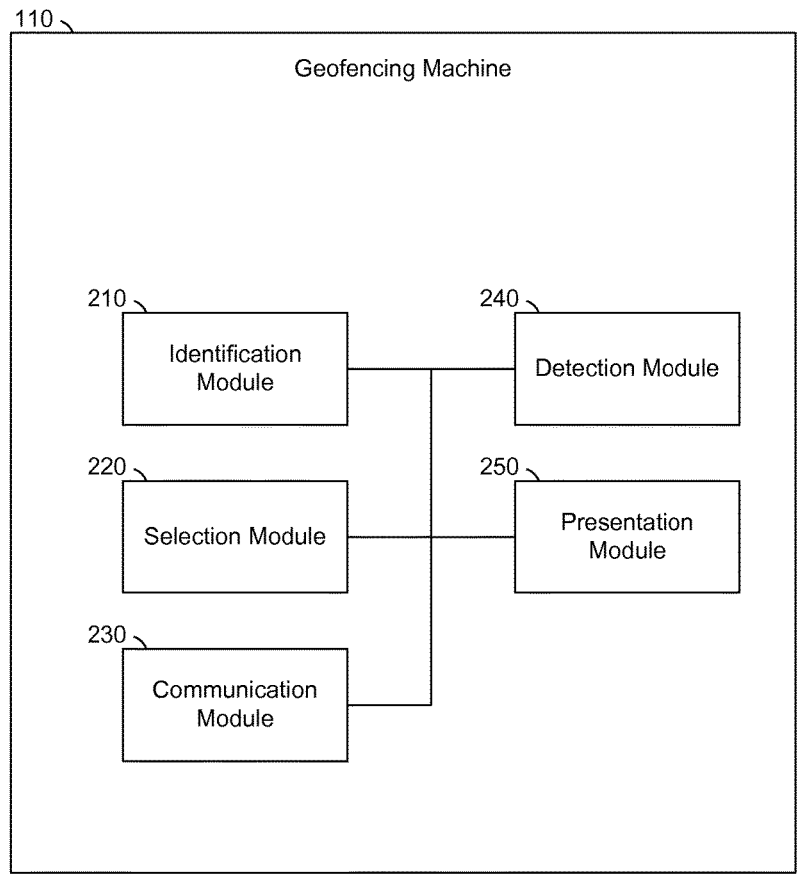
FIG. 2 is a block diagram illustrating components of a geofencing machine, according to some example embodiments.

FIG. 2 is a block diagram illustrating components of the geofencing machine 110, according to some example embodiments. The geofencing machine 110 is shown as including an identification module 210, a selection module 220, a communication module 230, a detection module 240, and a presentation module 250, all configured to communicate with each other (e.g., via a bus, shared memory, or a switch). Any one or more of the modules described herein may be implemented using hardware (e.g., a processor of a machine) or a combination of hardware and software. For example, any module described herein may configure a processor to perform the operations described herein for that module. Moreover, any two or more of these modules may be combined into a single module, and the functions described herein for a single module may be subdivided among multiple modules. Furthermore, according to various example embodiments, modules described herein as being implemented within a single machine, database, or device may be distributed across multiple machines, databases, or devices.

In various example embodiments, the identification module 210 is configured to identify attributes of a geofence surrounding a location. The attributes of the geofence may represent merchant characteristics of a brick-and-mortar store (e.g., a physical retail location where items may be purchased from a merchant) located within the geofence or another physical location. For example, merchant characteristics may include hours of operation for the brick-and-mortar store, a target demographic served by the brick-and-mortar store, location of the brick-and-mortar store, or any suitable combination thereof. Merchant characteristics may also indicate a season during which the brick-and-mortar store most active (e.g., a season of the year during which the brick-and-mortar store is most frequently visited by customers). Merchant characteristics may also indicate aesthetic characteristics of the brick-and-mortar store (e.g., layout, culture, feel). In various example embodiments, the attributes of the geofence may also represent item characteristics of merchandise items available for sale from the brick-and-mortar store. The item characteristics may indicate at least one of a category of the merchandise items, price range of the merchandise items, purpose served by the merchandise items, features of the merchandise items, a targeted demographic for users of the merchandise items, or any suitable combination thereof. Item characteristics may also indicate whether the item is common, luxurious, or any suitable combination thereof. In various example embodiments, the attributes of the geofence may indicate times during which the geofence is active. In some instances, the times during which the geofence is active may correspond to hours of operation of the brick-and-mortar store surrounded by the geofence. In various example embodiments, the attributes of the geofence may also indicate software compatibility of the merchandise items available for sale from the brick-and-mortar store. For instance, the merchandise items inside the brick-and-mortar store may be software applications that are compatible with Android devices. As another example, the merchandise items inside the brick-and-mortar store may be software applications that are compatible with iOS devices.

In various example embodiments, the selection module 220 is configured to select a subset of users from a plurality of users eligible to receive the geofence based at least in part on matching the attributes of the geofence to preferences associated with each user among the subset of users. The preferences associated with each user may indicate item preferences, location preferences, time preferences, or any suitable combination thereof. For instance, the item preferences of the user may indicate item characteristics that the user prefers or item characteristics of items having the greatest likelihood of being purchased by the user. Location preferences may indicate areas frequently visited by the user or locations having a greatest likelihood of being visited by the user. Time preferences may indicate hours during which the user is most likely to be engaging in shopping activity. In various example embodiments, the plurality of eligible users may be determined by the selection module 220 as users that have a mobile application installed on their client devices. The mobile application may be capable of receiving geofence data from the geofencing machine 110. The selection module 220 may be further configured to determine that the selected subset of users have preferences that match with at least a threshold number of the attributes of the geofence. In various example embodiments, the selection module 220 is further configured to select the subset of users eligible to receive the geofence based on matching the attributes of the geofence to user demographics of the plurality of users. The user demographics of the plurality of users may be retrieved by the communication module 230, as further explained below. The user demographics may indicate at least one of gender, race, occupation, dietary preferences, age, marital status of each of the plurality of users, or any suitable combination thereof. In various example embodiments, the selection module 220 is further configured to select the subset of users based in part on determining that the subset of users are located within a pre-defined distance from the geofence. The communication module 230 may be configured to receive location data from each of the client devices operated by the plurality of users. Moreover, the location data may be used to indicate a location of the user (e.g., location coordinates, address). The location data can be collected by a mobile application installed on each of the client devices. Moreover, the subset of users may authorize the collection of the location data by the mobile application. The selection module 220 may be further configured to determine that users included in the subset of users are located within the pre-defined distance from the geofence based on the received location data. In various example embodiments, the selection module 220 is further configured to perform the selection of the subset of users during the active times indicated by the attributes of the geofence. For instance, the selection module 220 may perform selection of the user during the hours of operation of the brick-and-mortar store located within the geofence. As another example, the selection module 220 may perform selection of the user during the season when the brick-and-mortar store is most active (e.g., a season of the year during which the brick-and-mortar store is most frequented visited by customers). For example, during Christmas time, the brick-and-mortar store may have the greatest amount of customers and the selection module 220 may perform selection of the subset of users during that season. In various example embodiments, the selection module 220 is further configured to select the subset of users based in part on the software compatibility of the merchandise items available for sale. For instance, the selection module 220 may select users that are operating devices compatible with Android software because the brick-and-mortar store has software applications for Android. In various example embodiments, the selection module 220 may further determine that the users excluded from the subset of users have preferences that match with less than a pre-defined threshold amount of the attributes of the geofence. For instance, users that prefer to shop for shoes may be excluded from a geofence surrounding a brick-and-mortar store that sells cosmetics. As another example, users that prefer to shop in the evenings may be excluded from a geofence surrounding a brick-and-mortar store that is open only in the mornings.

In various example embodiments, the communication module 230 is configured to send geofence data representing the geofence to each of the client devices operated by the subset of the plurality of users in order to detect users of the client devices that cross the geofence surrounding the location. The geofence data may be representative of the geofence. For instance, the geofence data may be location coordinates that indicate the boundaries of the geofence. As further explained below, the geofence data may be used to detect when a user crosses the geofence. Each user among the plurality of users may be operating a client device in communication with a central server. Moreover, the communication module 230 may be used to facilitate the communication between each of the client devices with the central server. The preferences of the plurality of users may be retrieved by the central server based at least in part on the communication with the central server. In various example embodiments, the communication module 230 may retrieve the preferences of the plurality of users from a database managed by the central server. The database may include profiles corresponding to the plurality of users. In various example embodiments, the communication module 230 may retrieve the preferences of the plurality of users from each of the client devices operated by the plurality of users. In various example embodiments, the communication module 230 is further configured to retrieve user demographics of the plurality of users based at least in part on the communication between the client devices with the central server, such as via a mobile application installed and authorized by the user.

In various example embodiments, the detection module 240 is configured to receive an indication, from a client device operated by a user among the plurality of users, of the user crossing into the geofence based on the geofence data sent to the client device operated by the user. In various example embodiments, the detection module 240 is further configured to track user activity across each of the client devices and storing information related to the user activity in the profiles corresponding to the plurality of users. In various example embodiments, the detection module 240 may be further configured to receive the user activity from each of the client devices. In other words, the user activity information may be sent at regular intervals to the detection module 240 by the client device. The profiles corresponding to the plurality of users may be stored in the database managed by the central server. The user activity may be used to indicate the preferences of each user among the plurality of users. As stated previously, the preferences associated with each user may indicate item preferences, location preferences, time preferences, or any suitable combination thereof. For instance, the detection module 240 may receive purchase history information that may indicate items previously purchased by each user. The purchase history information may further indicate a price range of the items previously purchased by each user. As another example, the detection module 240 may receive time information that may indicate hours during which each user is engaging in purchasing behavior. Lastly, the detection module 240 may receive travel information that indicates stores previously visited by each user. The user activity information may include information collected as the user performing actions on the client device using a mobile application installed on the client device.

In various example embodiments, the presentation module 250 is configured to present a notification to the client device operated by the user in response to the detection module 240 detecting the user as crossing into the geofence. The notification may regard the merchandise items available for sale from the brick-and-mortar store. The notification may be displayed by a mobile application installed on the client device. For instance, the mobile device may receive the notification in the form of data which is then processed by an application or an operating system installed on the mobile device for display. In various example embodiments, the presentation module 250 may present the notification to the client device in order to trigger performance of a pre-defined function on the client device. The pre-defined function may include displaying the notification.

Figure 3:
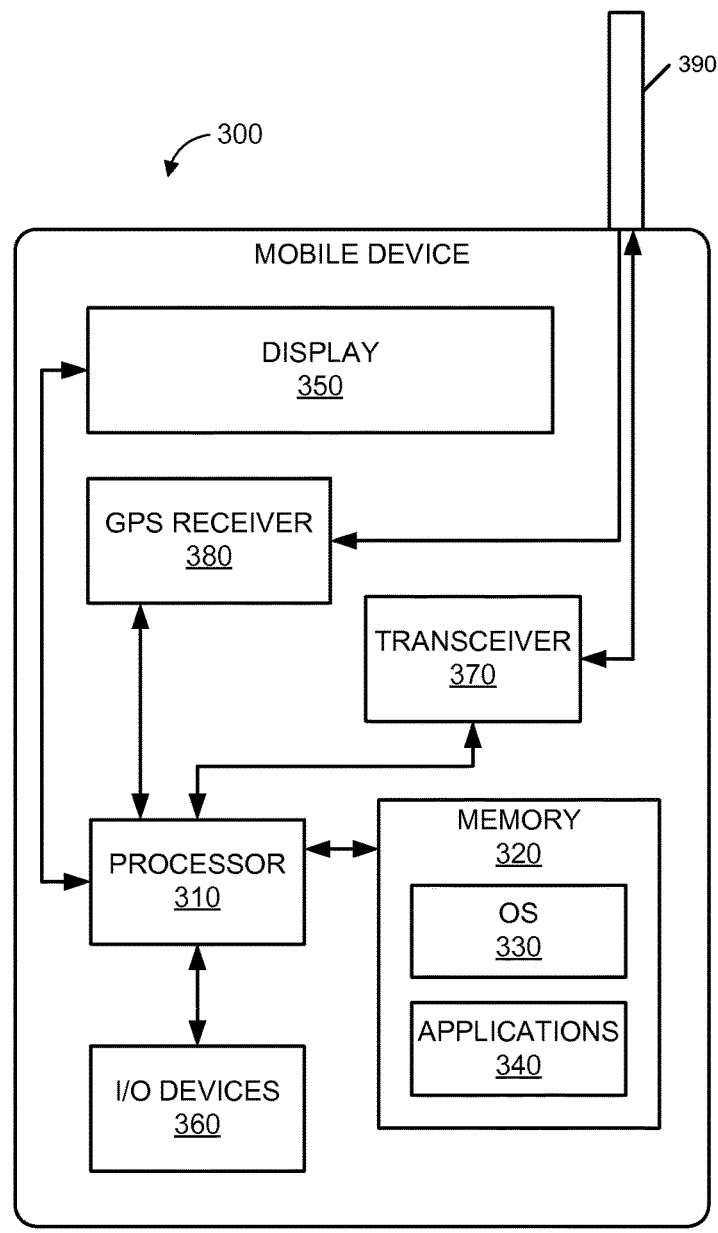
FIG. 3 is a block diagram illustrating a mobile device, according to some example embodiments.

FIG. 3 is a block diagram illustrating a mobile device, according to some example embodiments. In various example embodiments, device 130 of FIG. 1 may be represented by the mobile device 300 of FIG. 3. The mobile device 300 may include a processor 310. The processor 310 may be any of a variety of different types of commercially available processors suitable for mobile devices (for example, an XScale architecture microprocessor, a Microprocessor without Interlocked Pipeline Stages (MIPS) architecture processor, or another type of processor). A memory 320, such as a Random Access Memory (RAM), a Flash memory, or other type of memory, is typically accessible to the processor. The memory 320 may be adapted to store an operating system (OS) 330, as well as application programs 340, such as a mobile location enabled application that may provide LBSs to a user. The processor 310 may be coupled, either directly or via appropriate intermediary hardware, to a display 350 and to one or more input/output (I/O) devices 360, such as a keypad, a touch panel sensor, a microphone, and the like. Similarly, in some embodiments, the processor 310 may be coupled to a transceiver 370 that interfaces with an antenna 390. The transceiver 370 may be configured to both transmit and receive cellular network signals, wireless data signals, or other types of signals via the antenna 390, depending on the nature of the mobile device 300. In this manner, the connection with network-based system 105 via the network 190 may be established. Moreover, user activity on the mobile device 300 may be transmitted via the transceiver 370 from the mobile device 300 to the geofencing machine 110. Further, in some configurations, a GPS receiver 380 may also make use of the antenna 390 to receive GPS signals. The GPS signals may be used to track the location of the mobile device 300. Moreover, the GPS signals may constitute location data which may be transmitted from the mobile device 300 to the geofencing machine 110.

Figure 4:
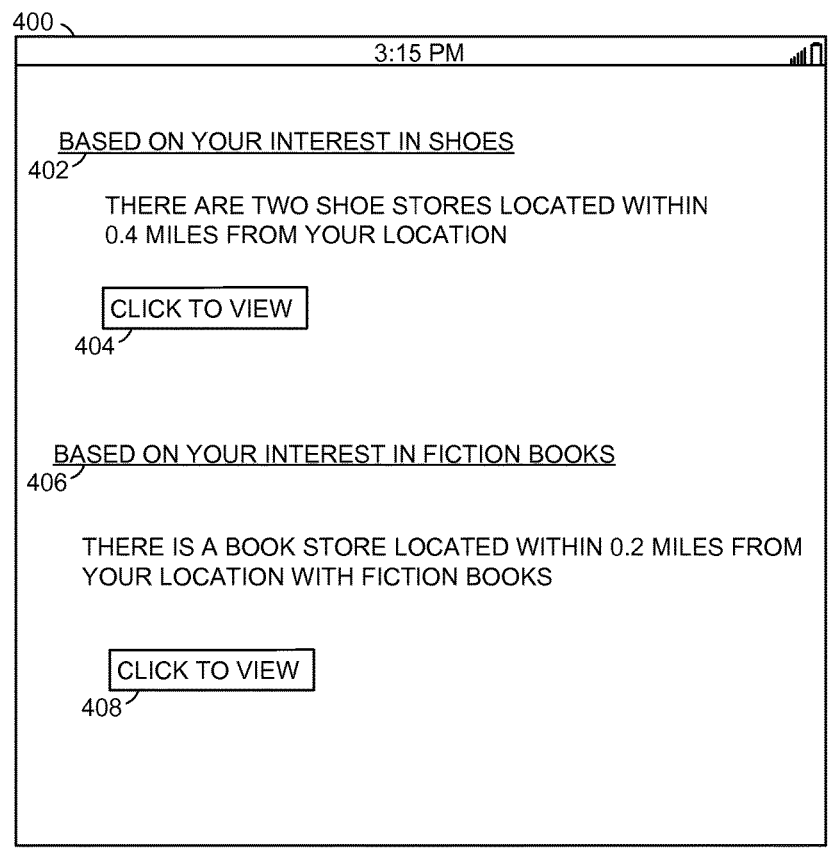
FIG. 4-5 are example user interfaces of a notification displayed on a client device operated by a user, according to some example embodiments.

FIG. 4 is an example user interface of a notification 400 displayed on a client device operated by a user, according to some example embodiments. The notification 400 may be presented by the presentation module 250 in response to the detection module 240 detecting that the user crosses into a geofence. Moreover, the user may have been selected by the selection module 220 as having preferences that match with the attributes of the geofence. The notification 400 may include a description 402 of how the geofence relates to the user (e.g., user has expressed an interest in shoes). Moreover, the notification 400 may indicate that there are two stores located within the geofence that carry shoes. The notification 400 may also include a further description 404 of how the geofence relates to the user (e.g., user has expressed an interest in fiction books). Moreover, the notification 400 may indicate that there is a book store located within the geofence that carries fiction books.

Figure 5:
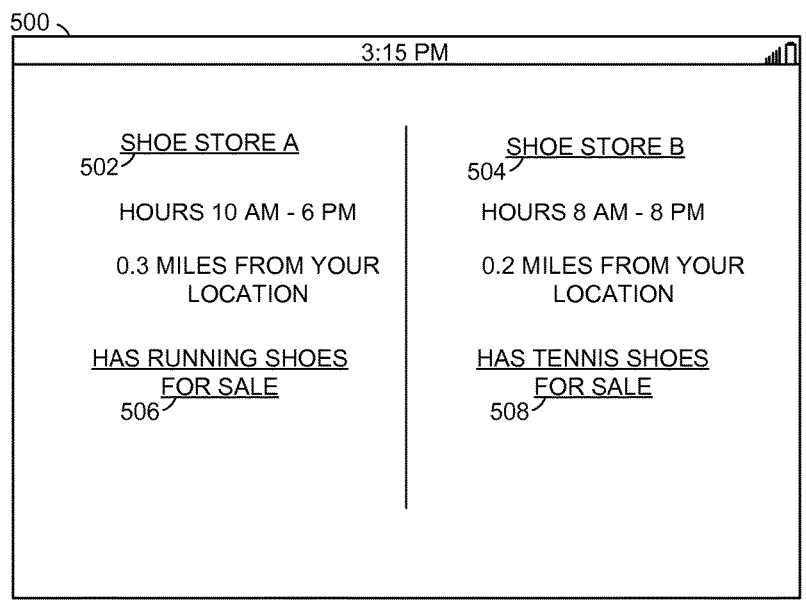

FIG. 5 is an example user interface of a notification 500 displayed on a client device operated by a user, according to some example embodiments. The notification may be presented in response to the user clicking on the option 404 in FIG. 4. The notification 500 may display shoe store 502 and shoe store 504 as both being located within the geofence. Moreover, the notification 500 may further display hours of operation for the shoe store 502 and for the shoe store 504. In various example embodiments, the hours of operation for the shoe store 502 and for the shoes store 504 may be represented as attributes of the geofence. Moreover, the location of each of the shoe stores 502 and 504 may be represented as attributes of the geofence. Lastly, the user may be selected by the selection module 220 as having preferences that match with the attributes of the geofence. For instance, both the shoe stores 502 and 504 may be open during the hours when the user prefers to go shopping. Moreover, both shoe stores 502 and 504 may be location within a pre-defined distance from the location of the user. The notification 500 may also display information regarding merchandise items available from each of the stores 502 and 504. For instance, a message 506 regarding running shoes available from store 502 may be displayed. Moreover, a message 508 regarding tennis shoes available from store 504 may be displayed.

Figure 6:
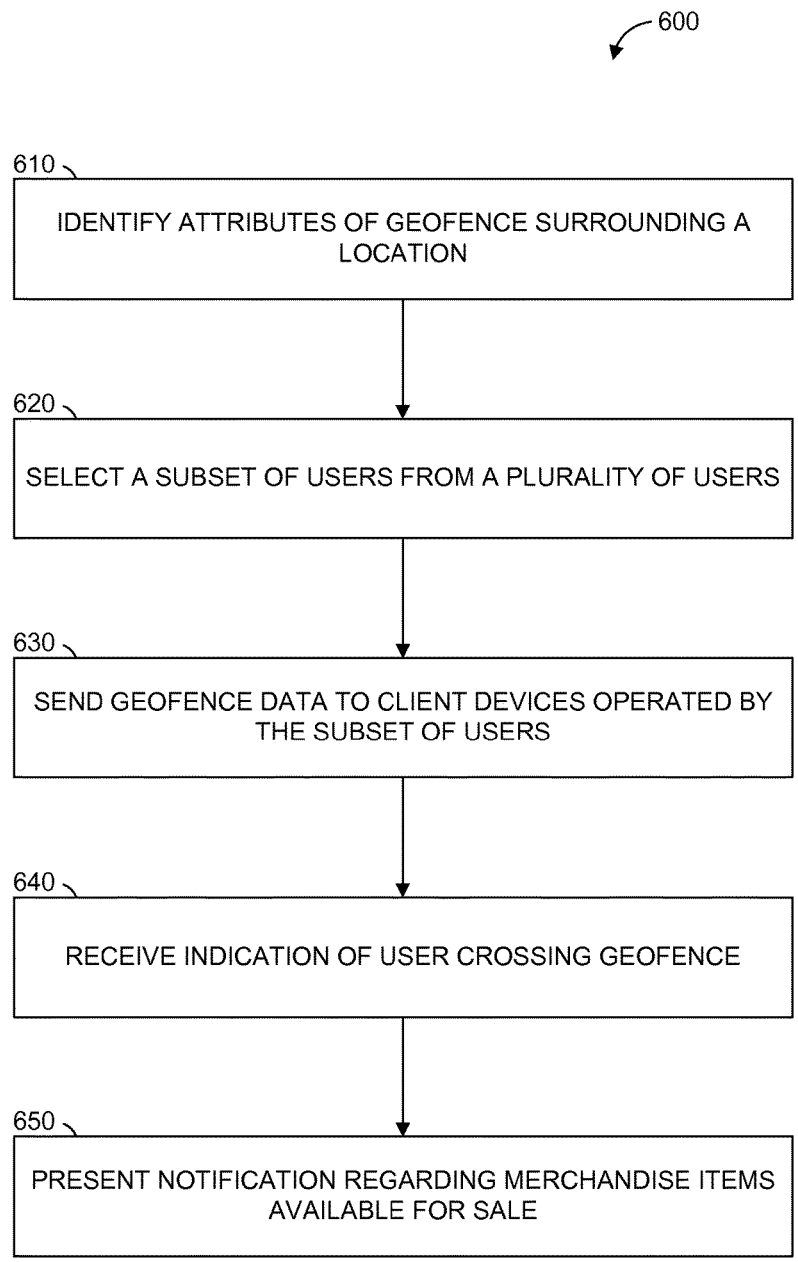
FIG. 6-7 are flowcharts illustrating operations of the geofencing machine in performing a method of presenting a notification regarding merchandise items available for sale, according to some example embodiments.
Figure 7:
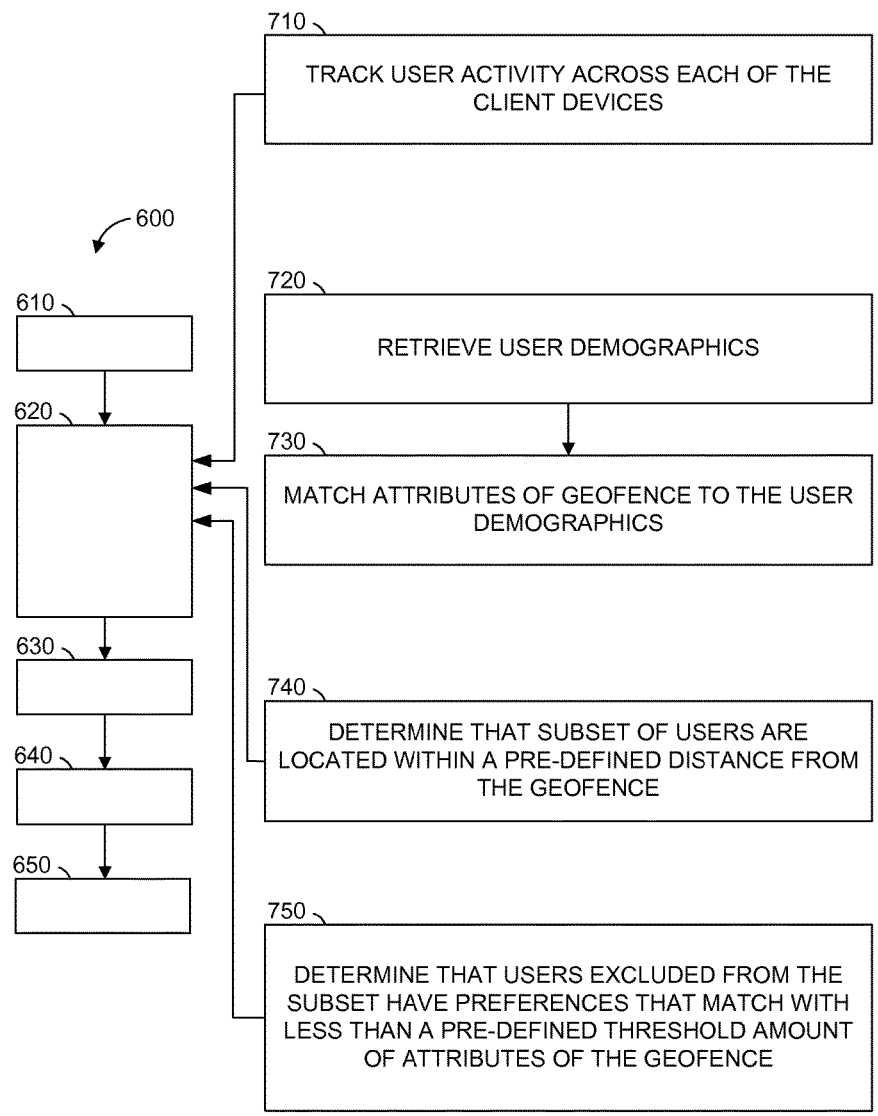

FIG. 6-7 are flowcharts illustrating operations of the geofencing machine 110 in performing a method 600 of presenting a notification regarding merchandise items available for sale, according to some example embodiments. Operations in the method 600 may be performed by the geofencing machine 110, using modules described above with respect to FIG. 2. As shown in FIG. 6, the method 600 includes identifying attributes of a geofence 610, selecting a subset of users 620, sending geofence data 630, receiving an indication from a client device 640, and presenting a notification to the client device 650.

At operation 610, the identification module 210 may identify attributes of a geofence surrounding a location. The attributes of the geofence may represent merchant characteristics of a brick-and-mortar store (e.g., a physical retail location where items may be purchased from a merchant) located within the geofence. In various example embodiments, the attributes of the geofence may also represent item characteristics of merchandise items available for sale from the brick-and-mortar store. In some example embodiments, identifying attributes of the geofence can involve receiving parameters defining aspects of the geofence from a merchant. In defining a desired geofence, a merchant can provide attributes that can be used to identify target mobile device users. The attributes provided by the merchant can be stored as part of the geofence data and be used by the selection module 220 to select target users.

At operation 620, the selection module 220 may select a subset of users from a plurality of users based at least in part on matching the attributes of the geofence to preferences associated with each user among the subset of users.

At operation 630, the communication module 230 may send geofence data representing the geofence to each of the client devices operated by the subset of the plurality of users in order to detect users of the client devices that cross the geofence surrounding the location. The geofence data may be representative of the geofence. For instance, the geofence data may be location coordinates that indicate the boundaries of the geofence.

At operation 640, the detection module 240 may receive an indication, from a client device operated by a user among the plurality of users, of the user crossing into the geofence based on the geofence data sent to the client device operated by the user.

At operation 650, the presentation module 250 may present a notification to the client device operated by the user. The notification may regard merchandise items available for sale from the brick-and-mortar store. In some example embodiments, the presentation module 250 can transmit a message, or similar data, to a client device operated by a user identified by the detection module 240 as being within the geofence. Upon receipt of the message, the client device can notify the user or perform a pre-defined function.

As shown in FIG. 7, the method 600 may include one or more of operations 710, 720, 730, 740, and 750. One or more of operations 710-750 may be performed as part (e.g., a precursor task, a subroutine, or a portion) of operation 620. At operation 710, the detection module 240 may track user activity across each of the user devices.

At operation 720, the communication module 230 may retrieve user demographics of the plurality of users based at least in part on the communication between the client devices with the central server. In various example embodiments, the communication module 230 is further configured to collect user activity data. In various example embodiments, the communication module 230 is further configured to access data repositories associated with the user (e.g., social network data associated with an account of the user, ecommerce data associated with an account of the user).

At operation 730, the selection module 220 may match the attributes of the geofence to the user demographics of the plurality of users. The user demographics may indicate at least one of gender, race, occupation, dietary preferences, age, marital status of each of the plurality of users, or any suitable combination thereof. The selection module 220 may be further configured to match the attributes of the geofence to the information received from the data repositories associated with the user (e.g., social network data associated with the account of the user, ecommerce data associated with the account of the user).

At operation 740, the selection module 220 may determine that users included in the subset of users are located within a pre-defined distance from the geofence.

At operation 750, the selection module 220 may determine that the users excluded from the subset have preferences that match with less than a pre-defined threshold amount of attributes of the geofence.

Figure 8:
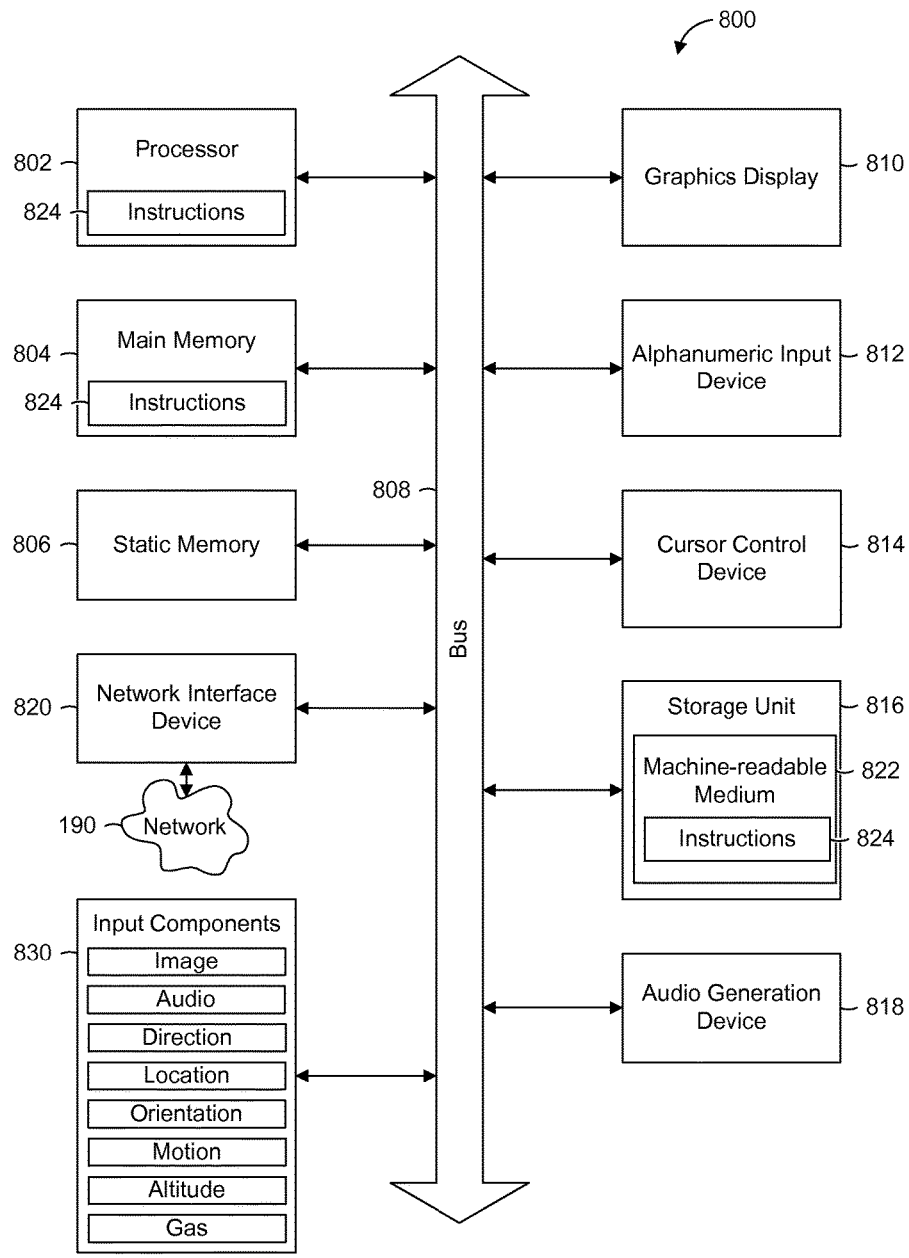
FIG. 8 is a block diagram illustrating components of a machine, according to some example embodiments, able to read instructions from a machine-readable medium and perform any one or more of the methodologies discussed herein.

FIG. 8 is a block diagram illustrating components of a machine 800, according to some example embodiments, able to read instructions 824 from a machine-readable medium 822 (e.g., a machine-readable storage medium, a computer-readable storage medium, or any suitable combination thereof) and perform any one or more of the methodologies discussed herein, in whole or in part. Specifically, FIG. 8 shows the machine 800 in the example form of a computer system within which the instructions 824 (e.g., software, a program, an application, an applet, an app, or other executable code) for causing the machine 800 to perform any one or more of the methodologies discussed herein may be executed, in whole or in part. In alternative embodiments, the machine 800 operates as a standalone device or may be connected (e.g., networked) to other machines. In a networked deployment, the machine 800 may operate in the capacity of a server machine or a client machine in a server-client network environment, or as a peer machine in a distributed (e.g., peer-to-peer) network environment. The machine 800 may be a server computer, a client computer, a personal computer (PC), a tablet computer, a laptop computer, a netbook, a cellular telephone, a smartphone, a set-top box (STB), a personal digital assistant (PDA), a web appliance, a network router, a network switch, a network bridge, or any machine capable of executing the instructions 824, sequentially or otherwise, that specify actions to be taken by that machine. Further, while only a single machine is illustrated, the term "machine" shall also be taken to include any collection of machines that individually or jointly execute the instructions 824 to perform all or part of any one or more of the methodologies discussed herein.

The machine 800 includes a processor 802 (e.g., a central processing unit (CPU), a graphics processing unit (GPU), a digital signal processor (DSP), an application specific integrated circuit (ASIC), a radio-frequency integrated circuit (RFIC), or any suitable combination thereof), a main memory 804, and a static memory 806, which are configured to communicate with each other via a bus 808. The processor 802 may contain microcircuits that are configurable, temporarily or permanently, by some or all of the instructions 824 such that the processor 802 is configurable to perform any one or more of the methodologies described herein, in whole or in part. For example, a set of one or more microcircuits of the processor 802 may be configurable to execute one or more modules (e.g., software modules) described herein.

The machine 800 may further include a graphics display 810 (e.g., a plasma display panel (PDP), a light emitting diode (LED) display, a liquid crystal display (LCD), a projector, a cathode ray tube (CRT), or any other display capable of displaying graphics or video). The machine 800 may also include an alphanumeric input device 812 (e.g., a keyboard or keypad), a cursor control device 814 (e.g., a mouse, a touchpad, a trackball, a joystick, a motion sensor, an eye tracking device, or other pointing instrument), a storage unit 816, an audio generation device 818 (e.g., a sound card, an amplifier, a speaker, a headphone jack, or any suitable combination thereof), and a network interface device 820.

The storage unit 816 includes the machine-readable medium 822 (e.g., a tangible and non-transitory machine-readable storage medium) on which are stored the instructions 824 embodying any one or more of the methodologies or functions described herein. The instructions 824 may also reside, completely or at least partially, within the main memory 804, within the processor 802 (e.g., within the processor's cache memory), or both, before or during execution thereof by the machine 800. Accordingly, the main memory 804 and the processor 802 may be considered machine-readable media (e.g., tangible and non-transitory machine-readable media). The instructions 824 may be transmitted or received over the network 190 via the network interface device 820. For example, the network interface device 820 may communicate the instructions 824 using any one or more transfer protocols (e.g., hypertext transfer protocol (HTTP)).

In some example embodiments, the machine 800 may be a portable computing device, such as a smart phone or tablet computer, and have one or more additional input components 830 (e.g., sensors or gauges). Examples of such input components 830 include an image input component (e.g., one or more cameras), an audio input component (e.g., a microphone), a direction input component (e.g., a compass), a location input component (e.g., a global positioning system (GPS) receiver), an orientation component (e.g., a gyroscope), a motion detection component (e.g., one or more accelerometers), an altitude detection component (e.g., an altimeter), and a gas detection component (e.g., a gas sensor). Inputs harvested by any one or more of these input components may be accessible and available for use by any of modules described herein.

As used herein, the term "memory" refers to a machine-readable medium able to store data temporarily or permanently and may be taken to include, but not be limited to, random-access memory (RAM), read-only memory (ROM), buffer memory, flash memory, and cache memory. While the machine-readable medium 822 is shown in an example embodiment to be a single medium, the term "machine-readable medium" should be taken to include a single medium or multiple media (e.g., a centralized or distributed database, or associated caches and servers) able to store instructions. The term "machine-readable medium" shall also be taken to include any medium, or combination of multiple media, that is capable of storing the instructions 824 for execution by the machine 800, such that the instructions 824, when executed by one or more processors of the machine 800 (e.g., processor 802), cause the machine 800 to perform any one or more of the methodologies described herein, in whole or in part. Accordingly, a "machine-readable medium" refers to a single storage apparatus or device, as well as cloud-based storage systems or storage networks that include multiple storage apparatus or devices. The term "machine-readable medium" shall accordingly be taken to include, but not be limited to, one or more tangible data repositories in the form of a solid-state memory, an optical medium, a magnetic medium, or any suitable combination thereof.

Throughout this specification, plural instances may implement components, operations, or structures described as a single instance. Although individual operations of one or more methods are illustrated and described as separate operations, one or more of the individual operations may be performed concurrently, and nothing requires that the operations be performed in the order illustrated. Structures and functionality presented as separate components in example configurations may be implemented as a combined structure or component. Similarly, structures and functionality presented as a single component may be implemented as separate components. These and other variations, modifications, additions, and improvements fall within the scope of the subject matter herein.

Certain embodiments are described herein as including logic or a number of components, modules, or mechanisms. Modules may constitute either software modules (e.g., code embodied on a machine-readable medium or in a transmission signal) or hardware modules. A "hardware module" is a tangible unit capable of performing certain operations and may be configured or arranged in a certain physical manner. In various example embodiments, one or more computer systems (e.g., a standalone computer system, a client computer system, or a server computer system) or one or more hardware modules of a computer system (e.g., a processor or a group of processors) may be configured by software (e.g., an application or application portion) as a hardware module that operates to perform certain operations as described herein.

In some embodiments, a hardware module may be implemented mechanically, electronically, or any suitable combination thereof. For example, a hardware module may include dedicated circuitry or logic that is permanently configured to perform certain operations. For example, a hardware module may be a special-purpose processor, such as a field programmable gate array (FPGA) or an ASIC. A hardware module may also include programmable logic or circuitry that is temporarily configured by software to perform certain operations. For example, a hardware module may include software encompassed within a general-purpose processor or other programmable processor. It will be appreciated that the decision to implement a hardware module mechanically, in dedicated and permanently configured circuitry, or in temporarily configured circuitry (e.g., configured by software) may be driven by cost and time considerations.

Accordingly, the phrase "hardware module" should be understood to encompass a tangible entity, be that an entity that is physically constructed, permanently configured (e.g., hardwired), or temporarily configured (e.g., programmed) to operate in a certain manner or to perform certain operations described herein. As used herein, "hardware-implemented module" refers to a hardware module. Considering embodiments in which hardware modules are temporarily configured (e.g., programmed), each of the hardware modules need not be configured or instantiated at any one instance in time. For example, where a hardware module comprises a general-purpose processor configured by software to become a special-purpose processor, the general-purpose processor may be configured as respectively different special-purpose processors (e.g., comprising different hardware modules) at different times. Software may accordingly configure a processor, for example, to constitute a particular hardware module at one instance of time and to constitute a different hardware module at a different instance of time.

Hardware modules can provide information to, and receive information from, other hardware modules. Accordingly, the described hardware modules may be regarded as being communicatively coupled. Where multiple hardware modules exist contemporaneously, communications may be achieved through signal transmission (e.g., over appropriate circuits and buses) between or among two or more of the hardware modules. In embodiments in which multiple hardware modules are configured or instantiated at different times, communications between such hardware modules may be achieved, for example, through the storage and retrieval of information in memory structures to which the multiple hardware modules have access. For example, one hardware module may perform an operation and store the output of that operation in a memory device to which it is communicatively coupled. A further hardware module may then, at a later time, access the memory device to retrieve and process the stored output. Hardware modules may also initiate communications with input or output devices, and can operate on a resource (e.g., a collection of information).

The various operations of example methods described herein may be performed, at least partially, by one or more processors that are temporarily configured (e.g., by software) or permanently configured to perform the relevant operations. Whether temporarily or permanently configured, such processors may constitute processor-implemented modules that operate to perform one or more operations or functions described herein. As used herein, "processor-implemented module" refers to a hardware module implemented using one or more processors.

Similarly, the methods described herein may be at least partially processor-implemented, a processor being an example of hardware. For example, at least some of the operations of a method may be performed by one or more processors or processor-implemented modules. Moreover, the one or more processors may also operate to support performance of the relevant operations in a "cloud computing" environment or as a "software as a service" (SaaS). For example, at least some of the operations may be performed by a group of computers (as examples of machines including processors), with these operations being accessible via a network (e.g., the Internet) and via one or more appropriate interfaces (e.g., an application program interface (API)).

The performance of certain operations may be distributed among the one or more processors, not only residing within a single machine, but deployed across a number of machines. In some example embodiments, the one or more processors or processor-implemented modules may be located in a single geographic location (e.g., within a home environment, an office environment, or a server farm). In other example embodiments, the one or more processors or processor-implemented modules may be distributed across a number of geographic locations.

Some portions of the subject matter discussed herein may be presented in terms of algorithms or symbolic representations of operations on data stored as bits or binary digital signals within a machine memory (e.g., a computer memory). Such algorithms or symbolic representations are examples of techniques used by those of ordinary skill in the data processing arts to convey the substance of their work to others skilled in the art. As used herein, an "algorithm" is a self-consistent sequence of operations or similar processing leading to a desired result. In this context, algorithms and operations involve physical manipulation of physical quantities. Typically, but not necessarily, such quantities may take the form of electrical, magnetic, or optical signals capable of being stored, accessed, transferred, combined, compared, or otherwise manipulated by a machine. It is convenient at times, principally for reasons of common usage, to refer to such signals using words such as "data," "content," "bits," "values," "elements," "symbols," "characters," "terms," "numbers," "numerals," or the like. These words, however, are merely convenient labels and are to be associated with appropriate physical quantities.

Unless specifically stated otherwise, discussions herein using words such as "processing," "computing," "calculating," "determining," "presenting," "displaying," or the like may refer to actions or processes of a machine (e.g., a computer) that manipulates or transforms data represented as physical (e.g., electronic, magnetic, or optical) quantities within one or more memories (e.g., volatile memory, non-volatile memory, or any suitable combination thereof), registers, or other machine components that receive, store, transmit, or display information. Furthermore, unless specifically stated otherwise, the terms "a" or "an" are herein used, as is common in patent documents, to include one or more than one instance. Finally, as used herein, the conjunction "or" refers to a non-exclusive "or," unless specifically stated otherwise.

What is claimed is:

1. A method comprising:
   determining, by a geofencing machine, a plurality of users that are eligible to receive geofence data associated with a geofence surrounding a location, the geofence data configured to provide a computing device with an ability to detect crossing into the geofence, said determining the plurality of users comprising:
   identifying one or more client devices with an installed application configured to receive the geofence data, each client device of the one or more client devices being associated with a respective user; and
   adding each respective user associated with each client device to the plurality of users that are eligible to receive the geofence data;
   identifying, by the geofencing machine, attributes of the geofence, the attributes comprising:
   merchant characteristics of a brick-and-mortar store located within the geofence; and
   item characteristics of merchandise items available for sale from the brick-and-mortar store;
   retrieving, by the geofencing machine, respective user preferences of each respective user of the plurality of users from a database managed by a central server, each respective client device associated with the respective user being in communication with the central server, said retrieving being based on the communication with the central server;
   selecting, by the geofencing machine, a subset of users from the plurality of users to receive the geofence data by, for each respective user of the plurality of users:
   determining whether the respective user preferences of the respective user include a predetermined number of user preferences that match the attributes of the geofence;
   in response to determining that the respective user preferences include the predetermined number of user preferences that match the attributes of the geofence, adding the respective user to the subset of users to receive the geofence data; and
   in response to determining that the respective user preferences have less than the predetermined number of user preferences that match the attributes of the geofence, excluding the respective user from the subset of users;
   sending, from the geofencing machine to each respective client device associated with each respective user of the subset of users, the geofence data to provide the respective client devices associated with the subset of users the ability to detect crossing into the geofence;
   receiving, at the geofencing machine, an indication, from a client device associated with a particular user of the subset of users, of the client device crossing into the geofence based on the geofence data; and
   causing, by the geofencing machine and in response to said receiving the indication, presentation of a notification at the client device associated with the particular user by transmitting data to the client device that causes display of the notification, the notification comprising information associated with the merchandise items available for sale from the brick-and-mortar store.

2. The method of claim 1, wherein the user preferences of the plurality of users are retrieved by the central server from each respective client device associated with the respective user of the plurality of users.

3. The method of claim 1, wherein the database includes profiles corresponding to the plurality of users.

4. The method of claim 3, further comprising:
   tracking, by the geofencing machine, user activity across each respective client device of each respective user of the plurality of users; and
   storing information related to the user activity in the profiles corresponding to the plurality of users.

5. The method of claim 1, further comprising:
   retrieving, by the geofencing machine, user demographics of the plurality of users based at least in part on the communication between each respective client device of each respective user of the plurality of users with the central server,
   wherein said selecting the subset of users from the plurality of users is further based on matching at least some of the attributes of the geofence to at least some of the user demographics of the plurality of users.

6. The method of claim 5, wherein the user demographics comprise at least one of gender, race, occupation, dietary preferences, age, and marital status of each respective user of the plurality of users.

7. The method of claim 1, wherein the attributes of the geofence comprise times during which the geofence is active, and
   wherein said selecting the subset of users is performed during the times when the geofence is active.

8. The method of claim 1, wherein the item characteristics comprise at least one of a category of the merchandise items, price range of the merchandise items, purpose served by the merchandise items, features of the merchandise items, and a targeted demographic for users of the merchandise items.

9. A system comprising:
   one or more processors and executable instructions accessible on a computer-readable medium that, responsive to execution by the one or more processors, cause the system to at least:
   determine a plurality of users that are eligible to receive geofence data associated with a geofence surrounding a location, the geofence data configured to provide a computing device with an ability to detect crossing into the geofence;
   identify attributes of the geofence, the attributes of the geofence comprising:
   merchant characteristics of a brick-and-mortar store located within the geofence; and
   item characteristics of merchandise items available for sale from the brick-and-mortar store;
   retrieve, from a database managed by a central server, respective user preferences of each respective user of a plurality of users, each respective user of the plurality of users associated with a respective client device in communication with the central server, said retrieval being based on the communication with the central server;
   select a subset of users from the plurality of users to receive the geofence data by, for each respective user of the plurality of users:

determining whether the respective user preferences of the respective user include a predetermined number of user preferences that match the attributes of the geofence;

in response to determining that the respective user preferences include the predetermined number of user preferences that match the attributes of the geofence, adding the respective user to the subset of users to receive the geofence; and in response to determining that the respective user preferences have less than the predetermined number of user preferences that match the attributes of the geofence, excluding the respective user from the subset of users;

send, from the system to each respective client device associated with each respective user of the subset of users, the geofence data to provide the respective client devices associated with the subset of users the ability to detect crossing into the geofence receive, at the system, an indication, from a client device associated with a particular user of the subset of users, of the client device crossing into the geofence based on the geofence data; and cause, in response to receiving the indication, presentation of a notification at the client device associated with the particular user by transmitting data to the client device that causes display of the notification, the notification comprising information associated with the merchandise items available for sale from the brick-and-mortar store.

10. The system of claim 9, wherein the user preferences of the plurality of users are retrieved by the central server from each respective client device associated with the respective user of the plurality of users.

11. The system of claim 9, wherein the database includes profiles corresponding to the plurality of users.

12. The system of claim 11, wherein the one or more processors are further configured to:
track user activity across each respective client device of each respective user of the plurality of users; and
store information related to the user activity in the profiles corresponding to the plurality of users.

13. The system of claim 9, wherein the one or more processors are further configured to:
retrieve user demographics of the plurality of users based at least in part on the communication between each respective client device of each respective user of the plurality of users with the central server,
wherein the one or more processors are further configured to select the subset of users to receive the geofence based on matching at least some the attributes of the geofence to at least some of the user demographics of the plurality of users.

14. The system of claim 13, wherein the user demographics comprise at least one of gender, race, occupation, dietary preferences, age, and marital status of each of the plurality of users.

15. The system of claim 9, wherein the attributes of the geofence comprise times during which the geofence is active, and
wherein the one or more processors are further configured to select the subset of users during the times when the geofence is active.

16. A non-transitory machine-readable medium storing instructions that, when executed by one or more processors of a machine, cause the machine to perform operations comprising:

determining a plurality of users that are eligible to receive geofence data associated with a geofence surrounding a location, the geofence data configured to provide a computing device with an ability to detect crossing into the geofence;

identifying attributes of the geofence, the attributes comprising:
merchant characteristics of a brick-and-mortar store located within the geofence; and
item characteristics of merchandise items available for sale from the brick-and-mortar store;

retrieving, from a database managed by a central server, respective user preferences of each respective user of the plurality of users, each respective user of the plurality of users associated with a respective client device in communication with the central server, said retrieving being based on the communication with the central server;

selecting a subset of users from the plurality of users to receive the geofence data by, for each respective user of the plurality of users:
determining whether the respective user preferences of the respective user include a predetermined number of user preferences that match the attributes of the geofence;
in response to determining that the respective user preferences include the predetermined number of user preferences that match the attributes of the geofence, adding the respective user to the subset of users to receive the geofence data; and
in response to determining that the respective user preferences have less than the predetermined number of user preferences that match the attributes of the geofence, excluding the respective user from the subset of users;

sending, from the machine to each respective client device associated with each respective user of the subset of users, the geofence data to provide the respective client devices associated with the subset of users the ability to detect crossing into the geofence;

receiving, at the machine, an indication, from a client device associated with a particular user of the subset of users, of the client device crossing into the geofence based on the geofence data; and causing, in response to said receiving the indication, presentation of a notification at the client device associated with the particular user by transmitting data to the client device that causes display of the notification, the notification comprising information associated with the merchandise items available for sale from the brick-and-mortar store.

17. The non-transitory machine-readable medium of claim 16, wherein said determining the plurality of users that are eligible to receive the geofence data further comprises:
identifying one or more computing devices with an installed application configured to receive the geofence data; and
adding each respective user associated with the one or more computing devices to the plurality of users that are eligible to receive the geofence data.

18. The non-transitory machine-readable medium of claim 16, wherein the item characteristics include an indication of software compatibility with an operating system, and
wherein said determining whether the respective user preferences of the respective user include the predetermined number of user preferences that match the attributes of the geofence further comprises:
identifying a client device operating system associated with the respective client device associated with the respective user; and
determining whether the client device operating system matches the indication of software compatibility.

19. The non-transitory machine-readable medium of claim 16, wherein the respective user preferences include an indication of shopping hour preferences.

20. The non-transitory machine-readable medium of claim 16, wherein the respective user preferences include one or more indications of stores previously visited.

* * * * *

UNITED STATES PATENT AND TRADEMARK OFFICE
CERTIFICATE OF CORRECTION

PATENT NO. : 10,318,990 B2
APPLICATION NO. : 14/242563
DATED : June 11, 2019
INVENTOR(S) : Chintan Jain et al.

Page 1 of 1

It is certified that error appears in the above-identified patent and that said Letters Patent is hereby corrected as shown below:

In the Claims

In Column 15, Line 9, in Claim 9, delete "geofence;" and insert -- geofence data; --, therefor.

In Column 15, Line 19, in Claim 9, delete "geofence" and insert -- geofence; --, therefor.

In Column 15, Line 51, in Claim 13, after "some" insert -- of --.

Signed and Sealed this
Twenty-first Day of July, 2020

Andrei Iancu
*Director of the United States Patent and Trademark Office*